United States Patent [19]
Gerberich

[11] 3,841,166
[45] Oct. 15, 1974

[54] VIBRATORY APPARATUS
[75] Inventor: Donald E. Gerberich, Aurora, Ill.
[73] Assignee: Borg-Warner Corporation, Chicago, Ill.
[22] Filed: June 13, 1972
[21] Appl. No.: 262,386

[52] U.S. Cl. .................................. 74/61, 74/216.5
[51] Int. Cl. ............................................. F16h 33/00
[58] Field of Search .......... 74/61, 216.5, 217 B, 219

[56] References Cited
UNITED STATES PATENTS

| | | | |
|---|---|---|---|
| 797,814 | 8/1905 | Mimard | 74/217 R |
| 2,245,788 | 6/1941 | Kempe | 74/217 R |
| 2,865,210 | 12/1958 | Fisher | 74/219 |
| 3,396,805 | 8/1968 | Muller | 74/61 |

FOREIGN PATENTS OR APPLICATIONS
1,100,935   4/1955   France ................. 74/216.5

Primary Examiner—Samuel Scott
Assistant Examiner—Wesley S. Ratliff, Jr.
Attorney, Agent, or Firm—Arthur M. Streich

[57] ABSTRACT

In a vibrating device in which vibration is provided in one direction by at least a pair of side-by-side motors having shafts rotating in opposite directions and with eccentric weights on the shafts, a timing belt engaging sprockets on the motor shafts to insure synchronization of the motors. In one form the belt is in a figure 8 configuration and in this form, separator means to reduce friction at the crossover location of the belt is provided.

3 Claims, 5 Drawing Figures

PATENTED OCT 15 1974          3,841,166
SHEET 1 OF 2
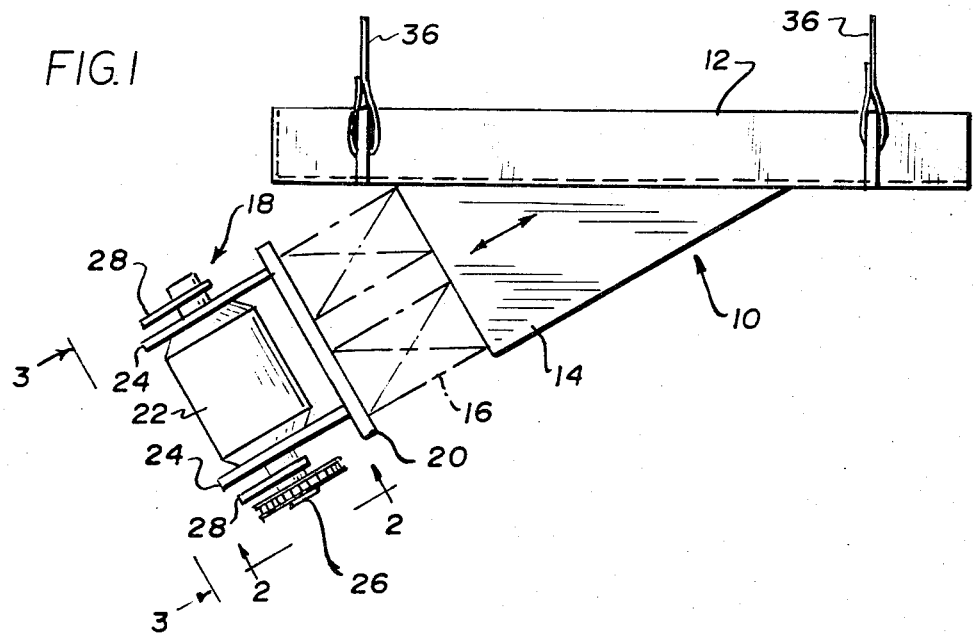
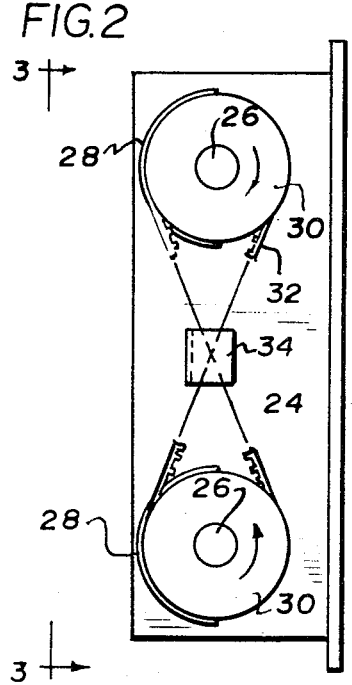
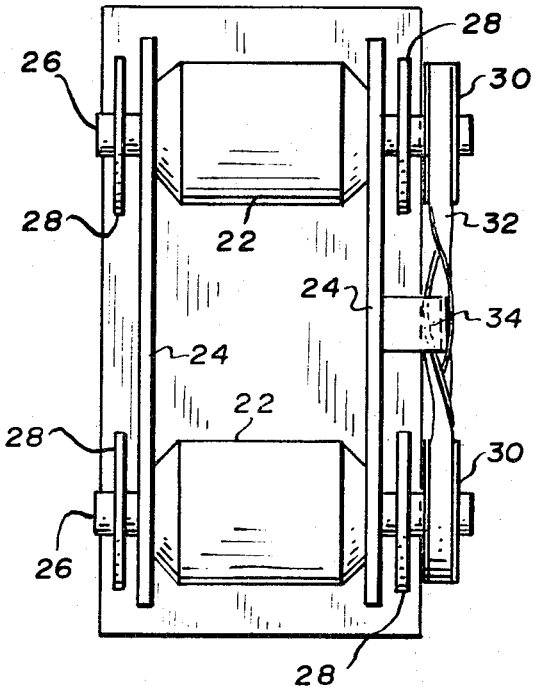

VIBRATORY APPARATUS

BACKGROUND OF THE INVENTION

Vibrating systems and equipment, such as feeders, screens, and the like use pairs of side-by-side motors whose shafts rotate in opposite directions and with eccentric weights on the shafts to provide vibratory motion in one direction. This is well known in the art. At normal operating R.P.M., the motors are fairly synchronized. However, when the motors drop below this normal, there is a synchronization problem which introduces undesirable, non-unidirectional vibrations in the system.

THE INVENTION

According to this invention, means are provided in a vibratory system in which unidirectional vibratory motion is imparted by eccentric weights mounted on the counterrotating shafts of side-by-side motors to insure synchronization of the motors at substantially all operating speed. This is accomplished by using a toothed timing belt meshing with sprockets on the motors' shafts. In one form, the belt is in a figure 8 configuration and in this form, a separator means, such as a flat plate which may be coated with a friction reducing material such as "Teflon," or the like, is used at the crossover location of the belt. The plate is supported in any suitable manner and is preferably supported for ease of replacement. In another form, idlers are provided to provide the correct path of the timing belt which does not cross itself.

THE DRAWINGS

FIG. 1 is a side view of a typical vibrating apparatus incorporating this invention;

FIG. 2 is a view taken on line 2—2 of FIG. 1

FIG. 3 is a view taken on line 3—3 of FIG. 1

DETAILED DESCRIPTION

Figure 5:
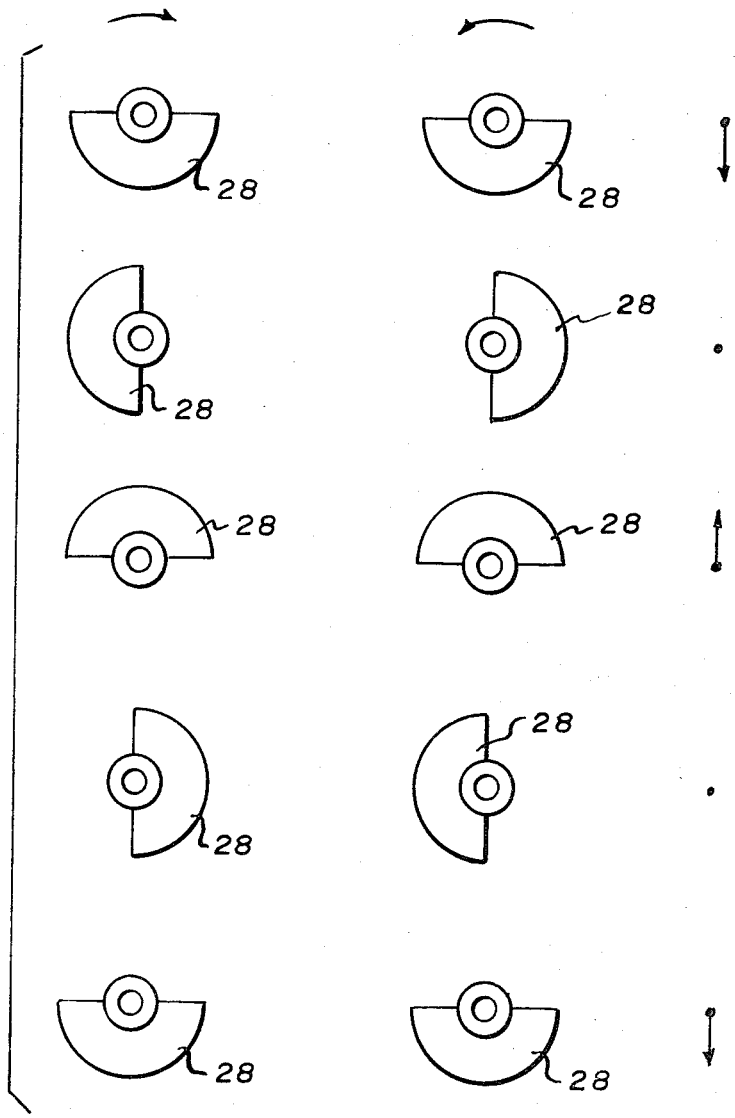
FIG. 5 is a force diagram illustrating the location of weights and resultant force for two motors rotating in opposite directions at full speed.

Looking now at FIG. 1 to 3, inclusive, there is illustrated a vibrating apparatus 10 having an open-ended trough 12 with an angularly disposed exciter supporting means 14 attached to the lower surface of the trough 12. The trough 12 and the exciter supporting means 14 are suitably constructed of sheet metal and angles which are welded together or otherwise suitably joined together. Attached to the supporting means 14 is one or more spring means 16, such as coil or leaf springs, or rubber blocks, to which is connected an exciter means 18. The exciter means 18 includes a relatively heavy support plate 20 directly connected to the springs and supporting at least a pair of like side-by-side motors 22, by means of motor support plates 24. The motors 22 have shafts 26, extending from both ends and an eccentric weight 28 is connected to each extending shaft. Also, a toothed timing sprocket 30 is attached to each motor sahft at one end. The sprockets 30 have the same pitch diameter.

Figure 4:
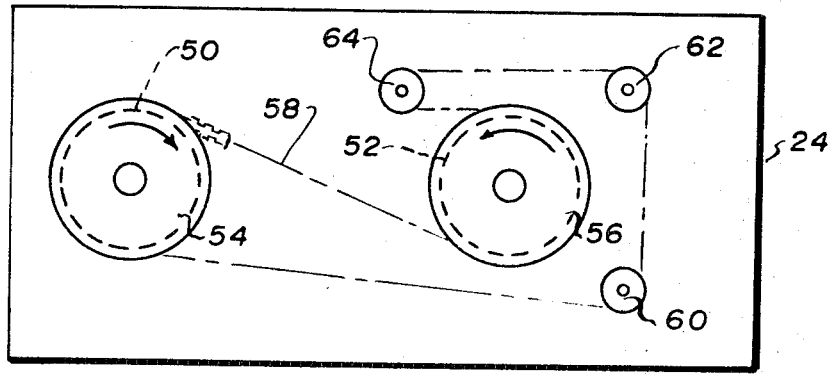
FIG. 4 is an alternative arrangement using a plurality of idler sprockets.

The motors 22 are wired to rotate in opposite directions so that, as shown in FIG. 4, the resultant vibratory force is unidirectional, as indicated by the arrow in FIG. 1. A toothed timing belt 32 engages the sprockets in a figure 8 configuration. To materially reduce friction at the crosscover location of the belt, a plate-like member 34 is provided and is placed between the belt runs. The member 23 is supported by a suitable bracket 36 supported from the motor supports 24. The plate member 34 may be of polished sheet metal, a plastic, or may be sheet metal coated with a friction reducing material such as "Teflon," or the like FIG. 4 illustrates a system having motors 50, 52, supported by the support 24, wired to rotate in opposite directions. The motor shafts have, in addition to toothed sprockets 54, 56, eccentric weights (not shown) as in the previous embodiment and as shown in FIG. 5. A timing belt 58 is entrained over the sprockets 54, 56 and also over a plurality of idlers 60, 62, and 64. This system is associated with the vibratory apparatus in the same manner as the previously described system. The idlers 60, 62, and 64 can be mounted on suitable shafts on the motors support 24.

As has been previously stated, there is little problem of motor synchronization at full motors RPM's; but at less than that condition, problems do exist which introduce variations in the vibratory motion of the apparatus. By using the invention just described, synchronization of the motor speeds is assured.

The vibratory apparatus just described may be suspended by cables or the like, such as indicated at 36, connected at one end to hooks 38 attached to the trough 12 and at the other end to other apparatus as for example, a hopper or the like from which material is discharged into the trough.

Other well known vibrating apparatus supporting means may be used, depending on the end use of the apparatus. For example, the entire apparatus may be supported on a base having leaf springs between the apparatus 10 and the base.

While the invention has been described with reference to the accompanying drawings showing a pair of side-by-side motors, it is to be understood that multiple pairs of motors can be used without departing from the spirit of the invention. In such a case, the timing belt will be duplicated for each pair of motors.

I claim:

1. In a vibrating device having at least a pair of side-by-side motors with eccentric weights attached to the ends of each motor shaft and with the motor shafts rotating in opposite directions to provide vibratory motion in one direction, the improvement comprising a toothed sprocket connected to each motor shaft, a timing belt engaging said sprockets in a figure-8 configuration to insure synchronization of the rotating motor shafts, and means separating said belt at the cross-over location to reduce frictional contact between the portions of said belt at said location.

2. In a vibrating device as rectied in claim 1 wherein said separating means in a flat plate member.

3. In a vibrating device as recited in claim 2 wherein said flat plate member is provided with a friction reducing coating.

* * * * *